US011173804B2

(12) United States Patent
Tsubokura et al.

(10) Patent No.: US 11,173,804 B2
(45) Date of Patent: Nov. 16, 2021

(54) V1G OR V2G SELECTION

(71) Applicant: Honda Motor Co., Ltd., Tokyo (JP)

(72) Inventors: Hidehiro Tsubokura, Redondo Beach, CA (US); Satoru Shinzaki, Rancho Palos Verdes, CA (US); David Wong Cun, Fountain Valley, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 16/589,451

(22) Filed: Oct. 1, 2019

(65) Prior Publication Data

US 2021/0094437 A1 Apr. 1, 2021

(51) Int. Cl.
*H02J 7/00* (2006.01)
*B60L 55/00* (2019.01)
*B60L 53/63* (2019.01)
*H02J 3/00* (2006.01)
*B60L 50/50* (2019.01)

(52) U.S. Cl.
CPC ............. *B60L 55/00* (2019.02); *B60L 50/50* (2019.02); *B60L 53/63* (2019.02); *H02J 3/005* (2013.01)

(58) Field of Classification Search
None
See application file for complete search history.

(56) References Cited

U.S. PATENT DOCUMENTS

| 7,952,319 | B2 | 5/2011 | Lowenthal et al. | |
|---|---|---|---|---|
| 7,956,570 | B2 | 6/2011 | Lowenthal et al. | |
| 9,387,767 | B2 | 7/2016 | Ishii et al. | |
| 9,987,940 | B2 | 6/2018 | Uyeki | |
| 2009/0313033 | A1* | 12/2009 | Hafner | G06Q 10/0637 705/1.1 |
| 2010/0063645 | A1* | 3/2010 | Brown | G06Q 50/06 700/296 |
| 2011/0106329 | A1* | 5/2011 | Donnelly | B60L 53/65 700/291 |
| 2011/0204851 | A1* | 8/2011 | Manotas, Jr. | B60L 55/00 320/128 |
| 2012/0013299 | A1* | 1/2012 | Prosser | B60L 53/63 320/109 |
| 2013/0024035 | A1* | 1/2013 | Ito | B60L 53/65 700/291 |

(Continued)

FOREIGN PATENT DOCUMENTS

| AU | 2014218477 | 9/2016 |
|---|---|---|
| CN | 105656066 | 5/2018 |
| WO | 2009014543 | 1/2009 |

*Primary Examiner* — Arun C Williams
(74) *Attorney, Agent, or Firm* — Rankin, Hill & Clark LLP (57) ABSTRACT

According to one aspect, a charging station or a system for adjustment of electric vehicle (EV) charging timing, power, or location in coordination with the electrical grid (V1G) or vehicle to grid bidirectional power flow (V2G) selection may include a memory, a processor, and a charge controller or controller. The memory may receive a profile associated with an electric vehicle (EV). The profile may be indicative of a V1G/V2G charging schedule preference for the EV. The processor may determine a presence of the EV and the charge controller may control charging of a battery of the EV by selecting V1G or V2G based on the profile and in accordance with the V1G/V2G charging schedule preference.

17 Claims, 5 Drawing Sheets

(56) References Cited

U.S. PATENT DOCUMENTS

| | | | |
|---|---|---|---|
| 2013/0054045 A1* | 2/2013 | Ramezani | B60L 53/67 700/297 |
| 2013/0057211 A1* | 3/2013 | Kuribayashi | B60L 53/65 320/109 |
| 2013/0138285 A1* | 5/2013 | Bozchalui | H02J 3/322 701/22 |
| 2019/0061552 A1 | 2/2019 | Amari et al. | |

* cited by examiner

V1G OR V2G SELECTION

BACKGROUND

Demand response is a way of changing power consumption of an electric utility customer in an attempt to match the demand for power with the supply. Utilities have traditionally matched demand and supply by throttling the generation rate at power plants, such as by taking generating units on or off line, or importing power from other utilities. However, there are limits as to what can be achieved on the supply side (i.e., generating units can take a long time to come up to full power, generating units may be very expensive to operate, demand can exceed the capacity of all the available power plants). Demand response attempts to adjust the demand for power rather than adjusting the supply of power. Utilities may signal demand requests to customers, including off-peak metering, where power is cheaper at certain times of the day, and smart metering, where specific requests or changes in price can be communicated to customers.

BRIEF DESCRIPTION

According to one aspect, a charging station for adjustment of electric vehicle (EV) charging timing, power, or location in coordination with the electrical grid (V1G) or vehicle to grid bidirectional power flow (V2G) selection, and may include a memory, a processor, and a charge controller. The memory may receive a profile associated with an electric vehicle (EV). The profile may be indicative of a V1G/V2G charging schedule preference. The processor may determine a presence of the EV. The charge controller may control charging of a battery of the EV by selecting V1G or V2G based on the profile and in accordance with the V1G/V2G charging schedule preference.

The memory may receive a number of charge cycles associated with the battery of the EV and the charge controller may generate the V1G or V2G selection based on the number of charge cycles associated with the battery. The profile associated with the EV may include a time associated with an anticipated next trip for the EV. The charge controller may generate the V1G or V2G selection based on the time associated with the anticipated next trip for the EV. The charge controller may generate a V1G selection based on an amount of time to the anticipated next trip for the EV being less than two charge cycles for the battery of the EV. The charge controller may generate a V2G selection based on an amount of time to the anticipated next trip for the EV being greater than or equal to two charge cycles for the battery of the EV.

The memory may receive data associated with a number of other EVs in a corresponding demand response coverage area and corresponding V1G or V2G selections for one or more of the number of other EVs. The charge controller may generate the V1G or V2G selection for the EV based on the corresponding V1G or V2G selections for one or more of the number of other EVs. The memory may receive data indicative of a V1G/V2G charging preference from a utility company. The charge controller may generate the V1G or V2G selection based on the V1G/V2G charging preference from the utility company.

According to one aspect, a system for adjustment of electric vehicle (EV) charging timing, power, or location in coordination with the electrical grid (V1G) or vehicle to grid bidirectional power flow (V2G) selection may include a memory, a processor, and a controller. The memory may receive a profile associated with an electric vehicle (EV). The profile may be indicative of a V1G/V2G charging schedule preference. The processor may determine a presence of the EV. The controller may control charging of a battery of the EV by selecting V1G or V2G based on the profile and in accordance with the V1G/V2G charging schedule preference.

The memory may receive a number of charge cycles associated with the battery of the EV and the controller may generate the V1G or V2G selection based on the number of charge cycles associated with the battery. The profile associated with the EV may include a time associated with an anticipated next trip for the EV. The controller may generate the V1G or V2G selection based on the time associated with the anticipated next trip for the EV.

According to one aspect, a method for adjustment of electric vehicle (EV) charging timing, power, or location in coordination with the electrical grid (V1G) or vehicle to grid bidirectional power flow (V2G) selection may include receiving a profile associated with an electric vehicle (EV). The profile may be indicative of a V1G/V2G charging schedule preference. The method for V1G or V2G selection may include determining a presence of the EV and controlling charging of a battery of the EV by selecting V1G or V2G based on the profile and in accordance with the V1G/V2G charging schedule preference.

The method for V1G or V2G selection may include receiving a number of charge cycles associated with the battery of the EV and generating the V1G or V2G selection based on the number of charge cycles associated with the battery. The profile associated with the EV may include a time associated with an anticipated next trip for the EV. The method for V1G or V2G selection may include generating the V1G or V2G selection based on the time associated with the anticipated next trip for the EV, generating a V1G selection based on an amount of time to the anticipated next trip for the EV being less than two charge cycles for the battery of the EV, and/or generating a V2G selection based on an amount of time to the anticipated next trip for the EV being greater than or equal to two charge cycles for the battery of the EV.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device. The memory may be present in or near the vehicle or a charging station, but may be at a remote location or in the cloud.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable computing devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
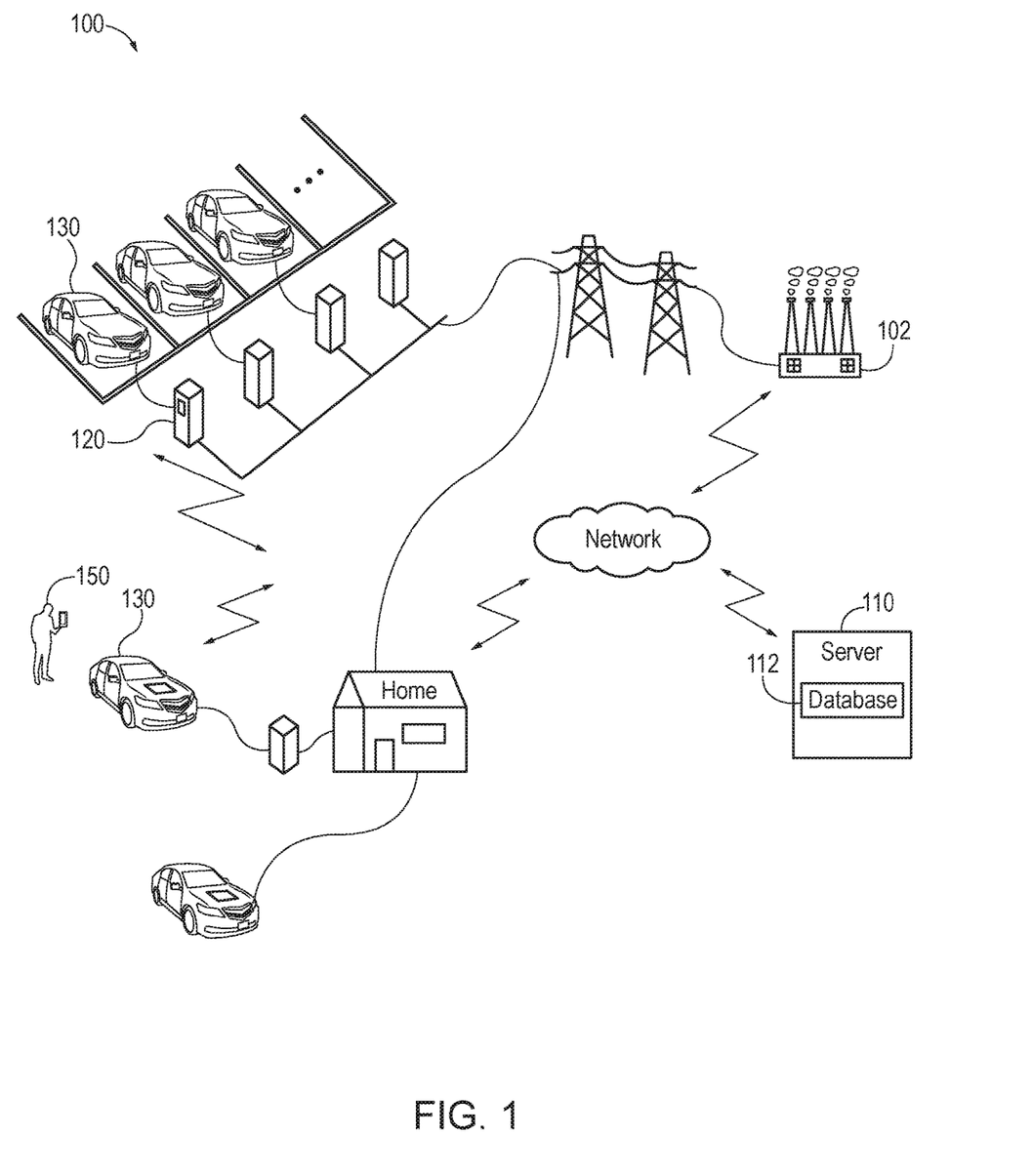
FIG. 1 is an exemplary component diagram of a system for adjustment of electric vehicle (EV) charging timing, power, or location in coordination with the electrical grid (V1G) or vehicle to grid bidirectional power flow (V2G) selection, according to one aspect.
Figure 2:
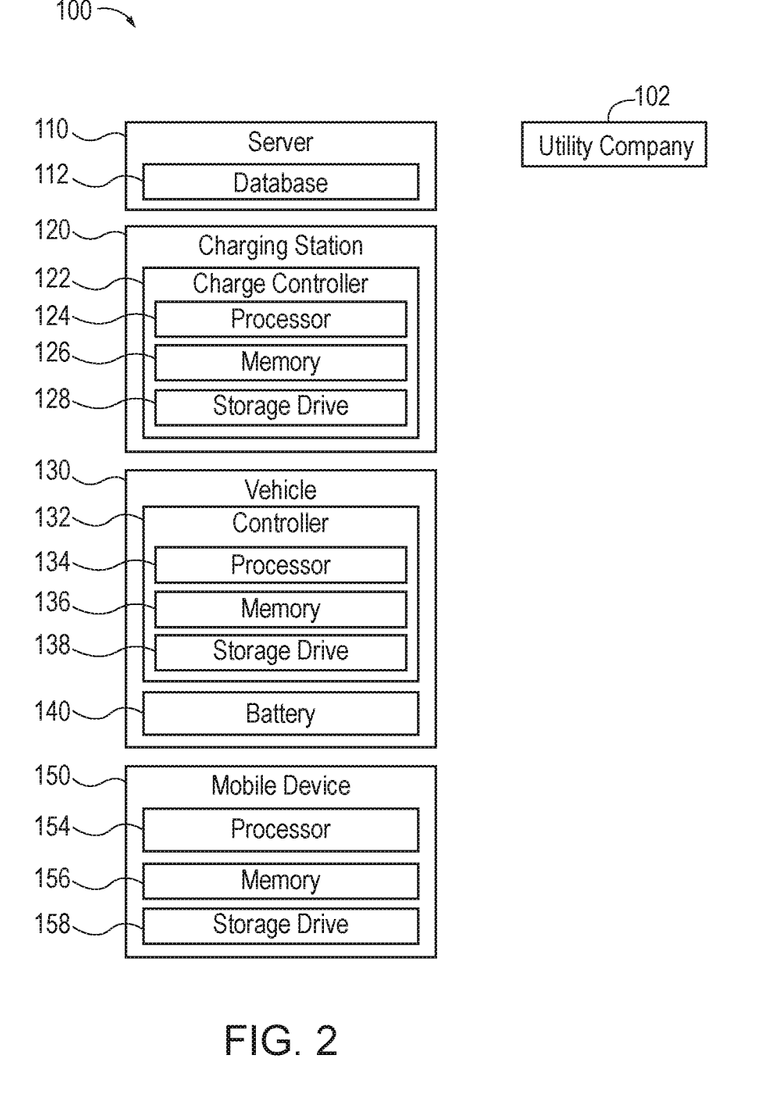
FIG. 2 is an exemplary component diagram of a system for adjustment of electric vehicle (EV) charging timing, power, or location in coordination with the electrical grid (V1G) or vehicle to grid bidirectional power flow (V2G) selection, according to one aspect.

FIGS. 1 and 2 are exemplary component diagrams of a system 100 for adjustment of electric vehicle (EV) charging timing, power, or location in coordination with the electrical grid (V1G) or vehicle to grid bidirectional power flow (V2G) selection, according to one aspect. A utility company 102 may supply power or electricity to one or more consumers. According to one aspect, a server 110 may include a database 112. The database 112 may contain or store information, such as a profile associated with one or more of the consumers for the utility. The profile may be utilized to facilitate charging at a charging station 120, for example. The charging station 120 may include a charge controller 122, which may include a processor 124, a memory 126, a storage drive 128, etc. The profile may also be utilized to facilitate charging of an electric vehicle (EV) at another location, such as at a home location, for example. There may be charging hardware at the home location which facilitates charging of the EV 130. In any event, the EV 130 may include a controller 132, a processor 134, a memory 136, a storage drive 138, and a battery 140.

According to one aspect, the profile may be generated and/or stored on a mobile device 150, such as a mobile device 150 associated with a user or a driver of the EV 130. The mobile device 150 may include a processor 154, a memory 156, and a storage drive 158. The mobile device 150 may transmit the profile to the database 112 of the server 110. The server 110 may be in computer communication with one or more of the mobile device 150, the vehicle, the charging station 120, etc. The mobile device 150 may receive user input via an interface, such as a display, touch screen, keyboard, etc., and build or generate the profile associated with the EV 130 based on the user input. For example, profile is indicative of a V1G/V2G charging schedule preference. In other words, the profile may indicate days of the week, times of day, locations, etc. where V1G may be preferred over V2G or V2G may be preferred over V1G, taking work schedules, holidays, or other factors into account. The charging station 120 may detect the mobile device 150 and implement the charging preference from the profile based thereon.

The profile may include information pertinent to the user's next trip or travel itinerary information. For example, the profile may include a time associated with an anticipated next trip for the EV 130. The anticipated next trip may be extrapolated by the processor 154 of the mobile device 150 based on calendar information stored on or accessible by the mobile device 150, historical trip data, email or text conversations, etc. For example, if the mobile device 150 receives a text message from a contact stating, "meet me in an hour", the anticipated next trip may be inferred by the processor 154 of the mobile device 150 to be in twenty minutes based on travel time to a location associated with the text message.

According to one aspect, the profile may be generated at the mobile device 150 and stored on the database 112 of the server 110. The database 112 of the server 110 may propagate the profile or profile information to a location where the EV 130 is to be charged, such as a home location, at a charging station 120, or directly to a storage drive 138 associated with the EV 130, for example. In this way, the profile may be implemented across a variety of environments (e.g., via any of the storage drives 128, 138, 158, etc. corresponding to the charging station 120, the EV 130, or the mobile device 150).

Described with respect to the charging station 120, the memory 126 of the charging station 120 may receive the profile associated with the EV 130. As previously discussed, this profile may include the V1G/V2G charging schedule preference information and anticipated next trip information. The processor 124 of the charging station 120 may determine the presence of the EV 130 and the charge controller 122 of the charging station 120 may control charging according to the corresponding profile. In other words, the charge controller 122 may control charging of the battery 140 of the EV 130 by selecting V1G or V2G based on the profile and in accordance with the V1G/V2G charging schedule preference.

According to one aspect, when the V1G charging type is selected, the charging station 120 may perform smart charging by charging in a unidirectional managed charging manner. In other words, V1G charging may include varying the time or rate at which the EV 130 is charged in order to provide ancillary services to the grid. Stated another way, V1G may include applications, such as timing the EV 130 to charge in the middle of the day to absorb excess solar generation, or varying the charge rate of the EV 130 to provide frequency response services or load balancing services for the utility company 102.

According to one aspect, V2G may include reverse power flow from the battery 140 of the EV 130 back to the utility company 102. V2G may be utilized with plug-in vehicles, such as BEVs and PHEVs, for example. In any event, the profile associated with the EV 130 may be utilized by the charge controller 122 of the charging station 120 or the controller of the EV 130 to communicate with the power grid, and thereby sell demand response services by either returning electricity to the grid or by throttling the charging rate associated with the EV 130 depending on or based on a variety of factors or characteristics associated with the profile, such as a number of battery cycles associated with the battery 140 of the EV 130, a next anticipated trip for the EV 130, demand response actions of other EVs within a predetermined area or radius, a charging schedule indicative of V1G or V2G charging preferences based on time, date, work schedule, location, next trip, etc.

Battery Cycles

According to one aspect, the memory 126 may receive a number of charge cycles associated with the battery 140 of the EV 130 and the charge controller 122 may generate the V1G or V2G selection based on the number of charge cycles associated with the battery 140 to mitigate excessive use of the battery 140 of the EV 130.

Anticipated Trip

According to one aspect, the charge controller 122 may generate the V1G or V2G selection based on the time associated with the anticipated next trip for the EV 130. For example, the charge controller 122 may generate a V1G selection based on an amount of time to the anticipated next trip for the EV 130 being less than two charge cycles for the battery 140 of the EV 130. In this way, mitigation of a scenario where the battery 140 is discharged via V2G and immediately recharged during a subsequent charging cycle is achieved. Similarly, the charge controller 122 may generate a V2G selection based on an amount of time to the anticipated next trip for the EV 130 being greater than or equal to two charge cycles for the battery 140 of the EV 130.

Overall Load Management Based on Other EV Responses

According to one aspect, the memory 126 may receive data associated with a number of other EVs in a corresponding demand response coverage area and corresponding V1G or V2G selections for one or more of the number of other EVs. The charge controller 122 may generate the V1G or V2G selection for the EV 130 based on the corresponding V1G or V2G selections for one or more of the number of other EVs. In other words, if enough of one or more of the other EVs within the demand response coverage area have already opted into the V2G or V1G demand response action based on a request by the utility company 102, there may not be as great of a need for the EV 130 to opt-in to the current demand response request. Therefore, the charge controller 122 may select V1G rather than V2G for the EV 130 based on the corresponding V1G or V2G selections or other overall load management for the demand response event within the demand response coverage area.

Additionally, the memory 126 may receive data indicative of a V1G/V2G charging preference from a utility company 102 and the charge controller 122 may generate the V1G or V2G selection based on the V1G/V2G charging preference from the utility company 102. Further, the charge controller 122 may shift from V2G to V1G during a demand response event. For example, if the next anticipated trip is cancelled or delayed, the charge controller 122 may shift from a V1G selection to a V2G selection during the middle of the demand response event. As another example, the charge controller 122 may begin the demand response event using V2G to contribute power to the grid and shift to V1G when the battery 140 discharges to a level (e.g., a state of charge or SOC) associated with the anticipated next trip, for example. In this way, the charge controller 122 may facilitate V1G/V2G charge selection based on information from the profile associated with the EV 130.

According to one aspect, the V1G/V2G selection may be based on a user input. In other words, a display of the EV 130 may prompt the user or the driver of the EV 130 to delay his or her anticipated next trip. If the user responds and accepts the delay, the V2G selection may be made by the charge controller 122. If the user declines to delay his or her trip, the V1G selection may be made, for example.

Figure 3:
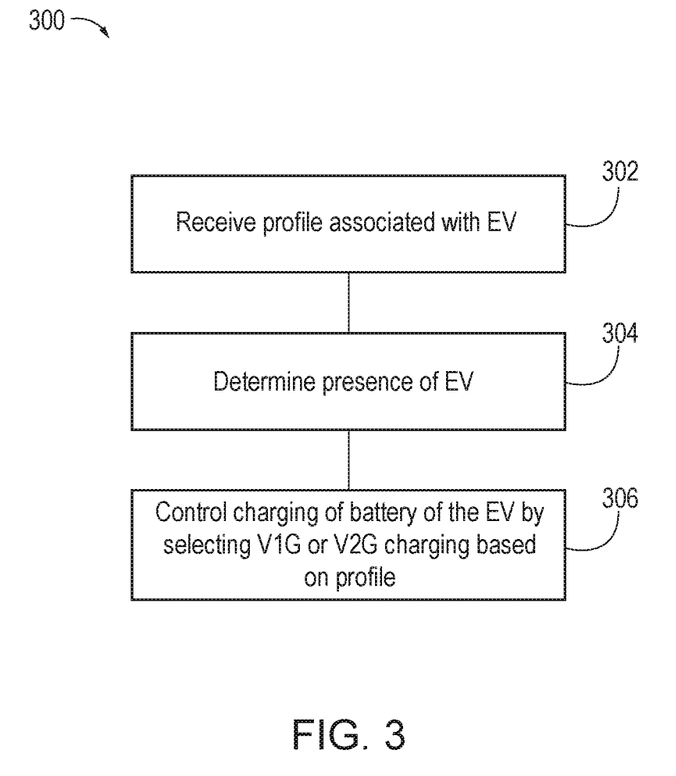
FIG. 3 is an exemplary flow diagram of a method for adjustment of electric vehicle (EV) charging timing, power, or location in coordination with the electrical grid (V1G) or vehicle to grid bidirectional power flow (V2G) selection, according to one aspect.

FIG. 3 is an exemplary flow diagram of a method 300 for adjustment of EV charging timing, power, or location in coordination with the electrical grid (V1G) or vehicle to grid bidirectional power flow (V2G) selection, according to one aspect. The adjustment may include temporal, power, or spatial adjustment of EV charging in coordination with the grid. The method 300 for V1G or V2G selection may include receiving 302 a profile associated with an EV, wherein the profile is indicative of a V1G/V2G charging schedule preference, determining 304 a presence of the EV 130, and controlling 306 charging of a battery of the EV 130 by selecting V1G or V2G based on the profile and in accordance with the V1G/V2G charging schedule preference.

The method may also include other acts or steps, such as receiving a number of charge cycles associated with the battery 140 of the EV 130, generating the V1G or V2G selection based on the number of charge cycles associated with the battery 140, receiving a time associated with an anticipated next trip for the EV 130, generating the V1G or V2G selection based on the time associated with the anticipated next trip for the EV 130, generating a V1G selection based on an amount of time to the anticipated next trip for the EV 130 being less than two charge cycles for the battery 140 of the EV 130, or generating a V2G selection based on an amount of time to the anticipated next trip for the EV 130 being greater than or equal to two charge cycles for the battery 140 of the EV 130.

Figure 4:
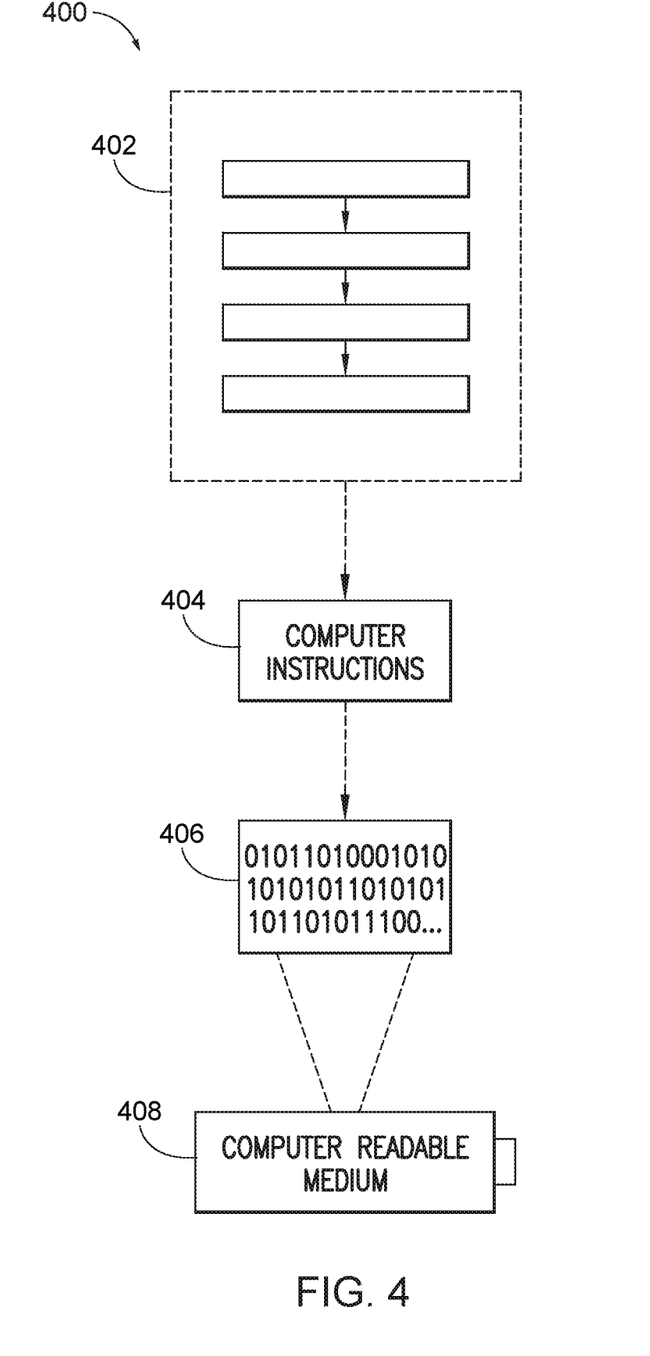
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 300 of FIG. 1. In another aspect, the processor-executable computer instructions 404 may be configured to implement a system, such as the system 100 of FIG. 1 or the system 100 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
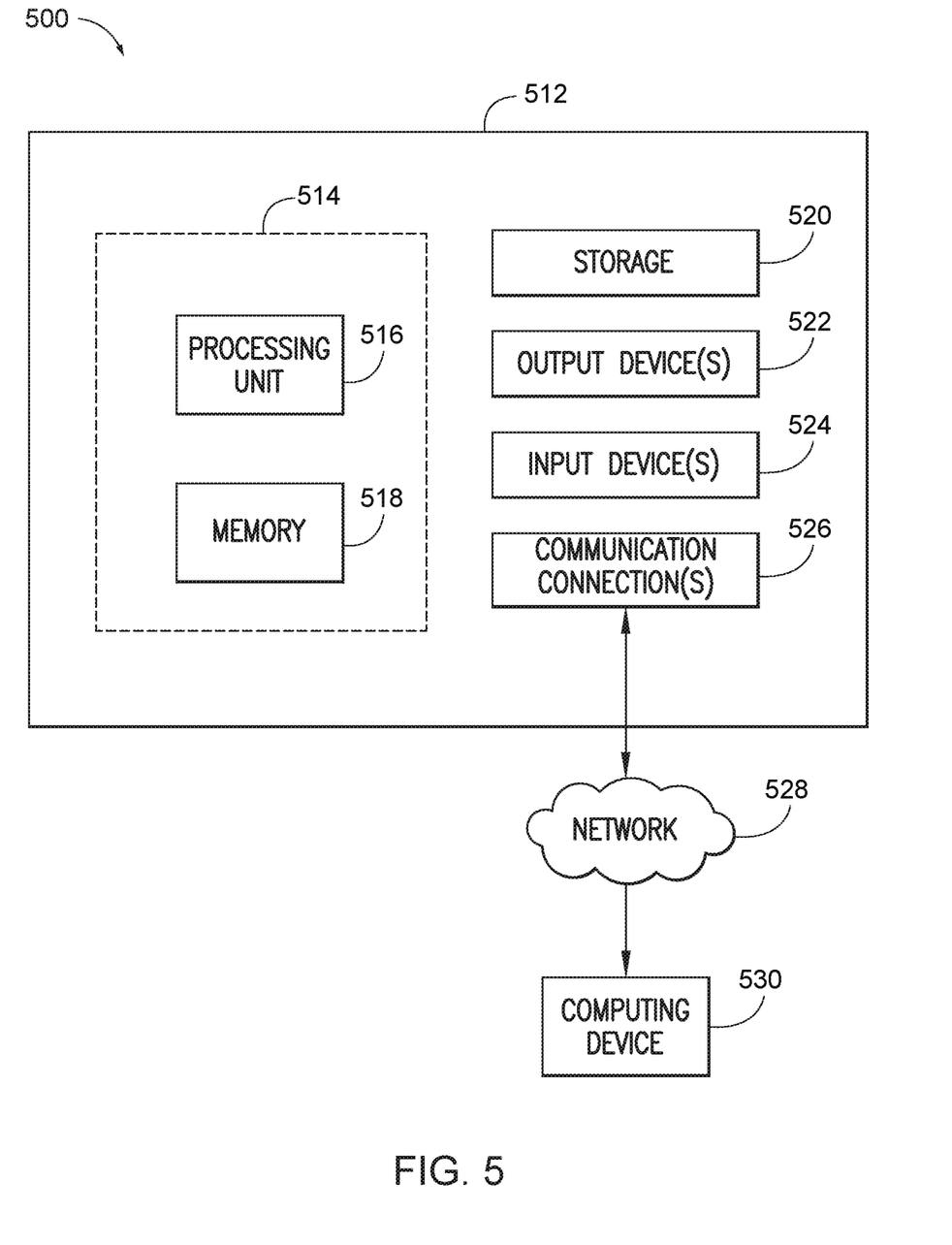
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and non-volatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A charging station for adjustment of electric vehicle (EV) charging timing, power, or location in coordination with the electrical grid (V1G) or vehicle to grid bidirectional power flow (V2G) selection, comprising:
  a memory receiving a profile associated with an electric vehicle (EV), wherein the profile is indicative of a V1G/V2G charging schedule preference;
  a processor determining a presence of the EV; and
  a charge controller controlling charging of a battery of the EV by selecting V1G or V2G based on the profile and in accordance with the V1G/V2G charging schedule preference,
  wherein the memory receives a number of charge cycles associated with the battery of the EV and the charge controller generates the V1G or V2G selection based on the number of charge cycles associated with the battery.

2. The charging station for V1G or V2G selection of claim 1, wherein the profile associated with the EV includes a time associated with an anticipated next trip for the EV.

3. The charging station for V1G or V2G selection of claim 2, wherein the charge controller generates the V1G or V2G selection based on the time associated with the anticipated next trip for the EV.

4. The charging station for V1G or V2G selection of claim 2, wherein the charge controller generates a V1G selection based on an amount of time to the anticipated next trip for the EV being less than two charge cycles for the battery of the EV.

5. The charging station for V1G or V2G selection of claim 2, wherein the charge controller generates a V2G selection based on an amount of time to the anticipated next trip for the EV being greater than or equal to two charge cycles for the battery of the EV.

6. The charging station for V1G or V2G selection of claim 1, wherein the memory receives data associated with a number of other EVs in a corresponding demand response coverage area and corresponding V1G or V2G selections for one or more of the number of other EVs.

7. The charging station for V1G or V2G selection of claim 6, wherein the charge controller generates the V1G or V2G selection for the EV based on the corresponding V1G or V2G selections for one or more of the number of other EVs.

8. The charging station for V1G or V2G selection of claim 1, wherein the memory receives data indicative of a V1G/V2G charging preference from a utility company.

9. The charging station for V1G or V2G selection of claim 8, wherein the charge controller generates the V1G or V2G selection based on the V1G/V2G charging preference from the utility company.

10. A system for adjustment of electric vehicle (EV) charging timing, power, or location in coordination with the electrical grid (V1G) or vehicle to grid bidirectional power flow (V2G) selection, comprising:
- a memory receiving a profile associated with an electric vehicle (EV), wherein the profile is indicative of a V1G/V2G charging schedule preference;
- a processor determining a presence of the EV; and
- a controller controlling charging of a battery of the EV by selecting V1G or V2G based on the profile and in accordance with the V1G/V2G charging schedule preference,
- wherein the memory receives a number of charge cycles associated with the battery of the EV and the controller generates the V1G or V2G selection based on the number of charge cycles associated with the battery.

11. The system for V1G or V2G selection of claim 10, wherein the profile associated with the EV includes a time associated with an anticipated next trip for the EV.

12. The system for V1G or V2G selection of claim 11, wherein the controller generates the V1G or V2G selection based on the time associated with the anticipated next trip for the EV.

13. A method for adjustment of electric vehicle (EV) charging timing, power, or location in coordination with the electrical grid (V1G) or vehicle to grid bidirectional power flow (V2G) selection, comprising:
- receiving a profile associated with an electric vehicle (EV), wherein the profile is indicative of a V1G/V2G charging schedule preference;
- determining a presence of the EV;
- controlling charging of a battery of the EV by selecting V1G or V2G based on the profile and in accordance with the V1G/V2G charging schedule preference;
- receiving a number of charge cycles associated with the battery of the EV; and
- generating the V1G or V2G selection based on the number of charge cycles associated with the battery.

14. The method for V1G or V2G selection of claim 13, wherein the profile associated with the EV includes a time associated with an anticipated next trip for the EV.

15. The method for V1G or V2G selection of claim 14, comprising generating the V1G or V2G selection based on the time associated with the anticipated next trip for the EV.

16. The method for V1G or V2G selection of claim 14, comprising generating a V1G selection based on an amount of time to the anticipated next trip for the EV being less than two charge cycles for the battery of the EV.

17. The method for V1G or V2G selection of claim 14, comprising generating a V2G selection based on an amount of time to the anticipated next trip for the EV being greater than or equal to two charge cycles for the battery of the EV.

* * * * *